United States Patent [19]

Dietzen et al.

[11] 3,738,003

[45] June 12, 1973

[54] BLADE MOUNTING ASSEMBLY FOR JIG SAW

[75] Inventors: William H. Dietzen, Fayetteville, N.C.; William R. Lessig, III; Leonard U. Alsruhe, both of Towson, Md.; Howard I. Younginer, Fayetteville, N.C.

[73] Assignee: Black and Decker Manufacturing Company, Towson, Md.

[22] Filed: Mar. 13, 1972

[21] Appl. No.: 233,921

[52] U.S. Cl........................ 30/392, 279/83, 83/698
[51] Int. Cl....................... B27b 19/08, B23b 31/12
[58] Field of Search............... 279/83; 30/392, 393, 30/394; 83/697, 698, 746, 523, 571, 573, 613

[56] References Cited
UNITED STATES PATENTS

| | | | |
|---|---|---|---|
| 1,984,500 | 12/1934 | Tautz | 279/83 |
| 3,186,726 | 6/1965 | Wilheln et al. | 279/83 |

Primary Examiner—Donald R. Schran
Attorney—Leonard Bloom, Joseph R. Slotnik and Edward D. Murphy

[57] ABSTRACT

In a portable electric jig saw of the type having a reciprocating power driven shaft to which a saw blade is adapted to be secured and wherein the shaft is of hollow tubular construction having its open free end formed to provide an interiorly positioned flat surface of substantial axial length and against which the saw blade is clamped so that the blade will be positioned in substantial alignment with the axis of the tubular shaft, the latter being provided with inwardly directed and oppositely disposed lanced portions constituting positive stops for limiting axial entry of the blade into the shaft and for confining the inner blade end against lateral movement, the arrangement being such that the blade may be easily and quickly assembled to the shaft to provide a secure and rigid mounting.

8 Claims, 6 Drawing Figures

PATENTED JUN 12 1973 3,738,003
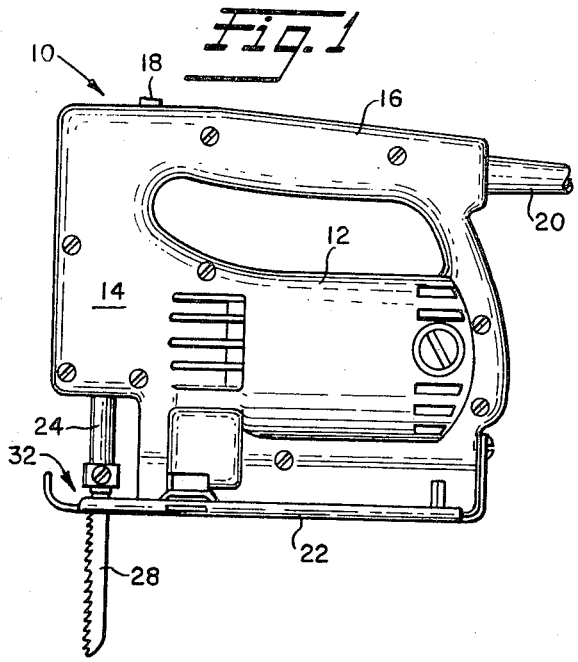
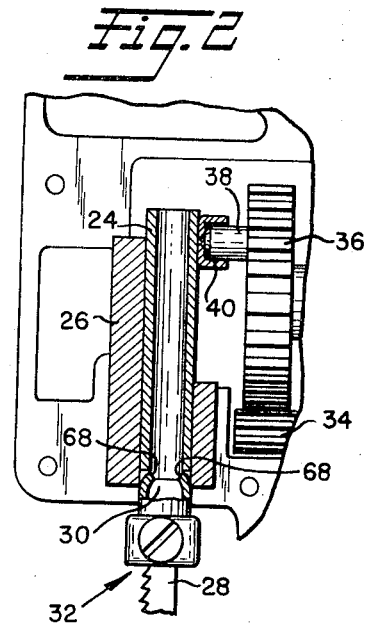
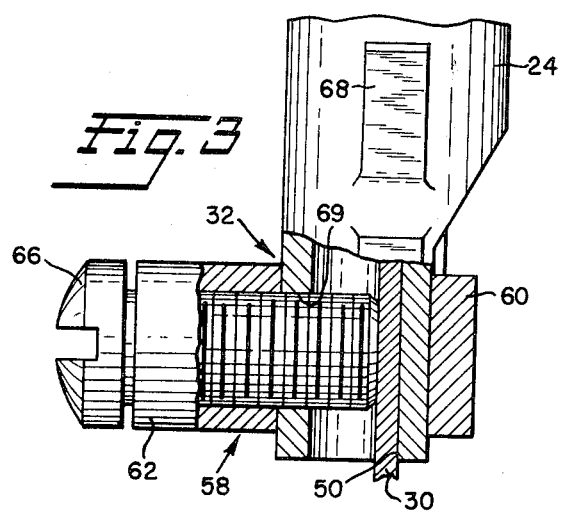
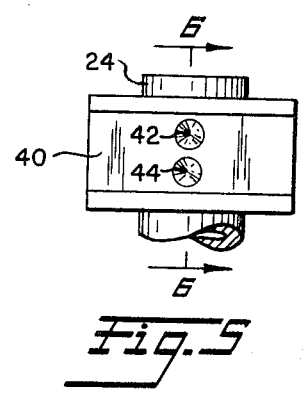
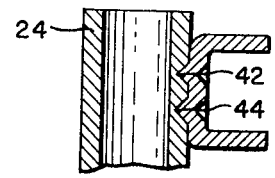
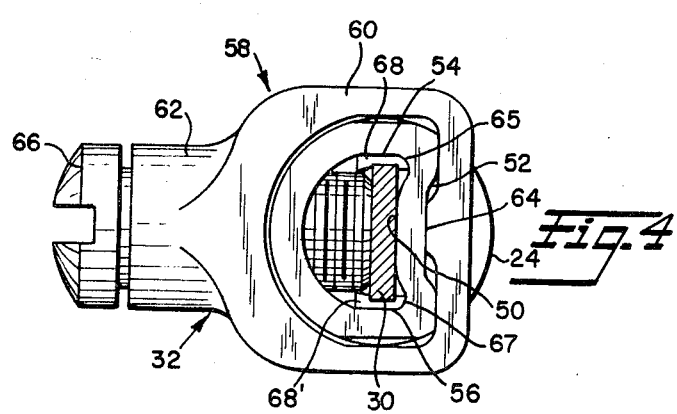

BLADE MOUNTING ASSEMBLY FOR JIG SAW

DESCRIPTION OF THE INVENTION

Various types of saw blade mountings for portable electric jig saws have heretofore been proposed. Among others, these include a screw threaded into the reciprocating shaft and extending through an opening in the saw blade. In some cases, two such screws may be used to confine the blade against lateral movement. In other cases, a stud, or the like, formed on the shaft and received in a blade opening stabilizes the blade.

In other prior saw blade mountings, set screw means threaded into the reciprocating shaft bears directly against the blade to retain and stabilize it. In still others, studs formed on the reciprocating shaft are received in holes punched in the shank of the saw blade, the latter being thereafter secured to the shaft by means of a clamping collar and set screw construction. In yet others, a slotted shaft is squeezed together to retain and stabilize the blade.

Mountings of this type are expensive in that they require the use of special blades having apertures formed therein in a particular location to fit the mounting screws and/or studs. Also, many of the reciprocating shafts referred to are fashioned from solid stock and require expensive processing in order to positively position and properly maintain the saw blade in an accurate condition for various types of sawing operations.

It is accordingly the principal object of the present invention to provide in a portable power operated jig saw, a novel blade mounting assembly which is so constructed as to avoid the aforementioned difficulties.

A further object of the invention is to provide an improved saw blade mounting arrangement wherein the reciprocating shaft of the power tool is constructed of hollow tubing which is so formed and shaped as to locate, confine and support the saw blade in a manner as to provide a stable and rigid mounting and avoid loosening or breakage of the blade during the usual stresses encountered in operation.

Another object is to provide in a saw blade mounting of the above type a novel construction wherein the free end portion of the reciprocating hollow tubular shaft is bent or pressed inwardly to provide an interiorly positioned flat surface of substantial axial length and against which the blade is clamped.

A still further object resides in the provision of a pair of oppositely positioned stops for limiting the axial entry of the blade into the hollow shaft, such stops being preferably formed as inwardly directed lanced portions formed in the shaft wall which also help to stabilize the blade against lateral movement.

Other objects and novel features of the invention will appear more fully hereinafter from a consideration of the following detailed description of the invention when taken in connection with the accompanying drawing illustrative of one form of the invention. It will be expressly understood however, that the drawing is employed for purposes of illustrating only and is not to be taken as a definition of the limits of the invention, reference being had for this purpose to the appended claims.

Referring to the drawing wherein similar reference characters denote similar parts throughout the several views:

FIG. 1 is an elevational side view of a portable electric jig saw including the novel blade mounting assembly of the present invention;

FIG. 2 is a fragmentary view partly in section and illustrating the mechanism for reciprocating the hollow shaft in which the saw blade is mounted;

FIG. 3 is an enlarged elevational view partly in section of the lower end portion of the hollow power driven reciprocating shaft and illustrates the manner in which the shaft is formed for accommodating the saw blade;

FIG. 4 is an end view of the parts shown in FIG. 3;

FIG. 5 is a detail view illustrating the connection of the transverse yoke and hollow shaft, and FIG. 6 is a sectional view taken along line 6—6 of FIG. 5.

The novel blade mounting assembly of the invention is illustrated in FIG. 1 as being incorporated in a conventional portable electric jig saw 10 although it will be appreciated that the same is equally applicable to a variety of reciprocating tools and appliances. More particularly, the jig saw 10 includes a motor housing 12, a gear case 14, an overhead handle 16, a switch 18 together with conventional line cord 20 and a shoe 22 for guiding the saw on a suitable workpiece. A reciprocating hollow tubular shaft 24, see FIG. 2, is suitably journalled in a bearing 26 within the gear case 14 and a saw blade 28 having a shank portion 30 is secured to the lower end portion of the tubular shaft 24 by the novel blade mounting assembly 32 to be described in detail hereinafter.

As shown in FIG. 2, a motor-driven pinion 34 meshes with a driven gear 36 and the latter is connected to reciprocate the hollow shaft 24 by means of a conventional "Scotch-yoke" type of motion-translation device. More particularly, such device includes an eccentric pin having a roller 38 carried by the gear 36 and engaging a transverse channel-shaped transverse yoke 40 secured to the shaft 24. Preferably, yoke 40 is formed with a pair of punched projections 42, 44 to facilitate "projection welding" to the shaft 24. From the arrangement just described it will be understood that upon rotation of the pinion 34 and gear 36, the hollow shaft 24 will be reciprocated within the bearing 26 due to the "Scotch-yoke" device comprising the eccentric pin 38 and the transverse yoke 40.

The novel features of the invention reside in the saw blade mounting assembly 32 which is illustrated in FIGS. 3 and 4. Therefrom, it will be seen that one side of the lower end portion of the hollow shaft 24 is pressed inwardly, by any suitable forming operation, to provide a flat interior surface 50 of substantial axial extent against which the shank portion 30 of the saw blade is adapted to be clamped and to also provide a longitudinally extending recess 52 shown more particularly in FIG. 4. During the forming operation the wall of the shaft 24 is also pressed inwardly in a direction at right angles to the plane of the surface 50 to provide diametrically opposed flattened surfaces 54 and 56 each of which is connected with the surface 50 by a fillet radius 65, 67. This construction provides a relatively wide dimensioned surface 50 for good blade clamping without requiring that the hollow shaft 24 be formed from a large diameter tube.

In order to clamp the saw blade 28 in its assembled position, a blade clamp 58 is formed to be received on the formed end portion of the shaft 24 and to be secured thereon. As shown, the clamp 58 includes a body portion 60 and a laterally extending tapped boss 62 aligned with an opening 69 in the shaft 24 for receiving a conventional screw 66 as shown in FIG. 3. As will be seen from FIG. 4, the body portion 60 is shaped in a manner similar to the formed end portion of the shaft 24 in order that the blade clamp 58 may be assembled on the shaft in position to be secured thereto. If desired, a longitudinally extending rib 64 may be formed on the body portion 60. This rib may be received within the recess 52 to facilitate assembly of the blade clamp 58 on the formed end portion of the shaft 24 and to constitute a support for the portion of the shaft wall engaging the blade shank 30 when the screw 66 is tightened against the shank.

The blade mounting assembly also includes a novel construction for limiting the axial entry of the shank of the saw blade into the hollow shaft 24 and for helping to confine the blade against lateral movement. As shown in FIGS. 2 and 3, such construction includes oppositely disposed lanced portions 66 and 68 formed in the wall of the shaft 24 for engaging the upper end of the blade shank 30. Such portions serve as positive axial stop means for the blade 28 when the latter is assembled as described. In addition, these lanced portions 66, 68 confine the blade against lateral movement in the plane of FIG. 2. The cooperating screw 66 and surface 50 confine the blade 28 against movement in the plane of FIG. 3. Thus, the blade 28 is securely and rigidly retained in place within the tubular shaft 24. Although the width of the same blade shanks 30 are fairly uniform for a wide variety of saw blades, the surfaces 54, 56 are spaced apart sufficiently to receive the largest standard size blade shank 30.

as to accurately locate the blade, it being only necessary to insert the blade shank to a position determined by the lanced portions in the shaft and to thereafter lock the blade in position by means of the screw provided. The assembly embodies a relatively simple arrangement which however, results in a relatively inexpensive yet highly reliable construction.

While the invention has been shown and described herein with considerably particularity, it will be understood that the scope thereof is to be determined by the appended claims.

What is claimed is:

1. In a portable electric jig saw of the type having a housing, a reciprocating shaft journalled therein and said shaft having a free end portion adapted to have a saw blade secured thereto, the invention wherein said reciprocating shaft is constructed of a hollow, metal tube having one side of its free end portion deformed inwardly to provide a flat interior surface of substantial axial length, said blade adapted to lie against said flat surface and being confined against lateral movement by means adjacent the inner wall of the tube adjacent said surface, and releasable means holding said blade against said surface.

2. A blade mounting assembly for a power operated jig saw comprising a hollow, metal tube having its end deformed inwardly to provide a flat interior surface, and releasable means adapted to hold said blade in engagement with said flat surface, said tube provided with stop means for positively limiting axial entry of the blade therein.

3. A blade mounting assembly as set forth in claim 2 wherein the flat interior surface is positioned such that when the blade is held in engagement therewith, the

UNITED STATES PATENT OFFICE
CERTIFICATE OF CORRECTION

Patent No. 3,738,003      Dated  June 12, 1973

Inventor(s) William H. Dietzen, William R. Lessig, III, et al
Leonard U. Alsruhe, and Howard I. Younginer It is certified that error appears in the above-identified patent and that said Letters Patent are hereby corrected as shown below:

Column 3, line 21, cancel "66 and"; line 26, cancel "66,"; line 37, cancel "66,"; and line 50, cancel "66,".

Signed and sealed this 6th day of August 1974.

(SEAL)
Attest:

McCOY M. GIBSON, JR.
Attesting Officer

C. MARSHALL DANN
Commissioner of Patents